United States Patent Office 3,333,013
Patented July 25, 1967

3,333,013
METHOD OF PRODUCING ETHYL SUBSTITUTED CYCLIC COMPOUNDS
Raymond A. Franz, Kirkwood, and Ronald O. Downs, St. Louis, Mo., assignors to Monsanto Company, St. Louis, Mo., a corporation of Delaware
No Drawing. Filed Jan. 22, 1965, Ser. No. 427,501
19 Claims. (Cl. 260—668)

The present invention relates to a process for producing ethyl-substituted cyclic compounds. More particularly, the present invention relates to a process for producing ethyl-substituted cyclic compounds from paraffinic hydrocarbons and unsaturated cyclic compounds having at least one methyl substituent on the cyclic ring.

Vinyl cyclic compounds, particularly styrene, are well known monomers which on polymerization produce versatile plastics having a multitude of applications. Most often, these monomers, which are in great demand, are obtained by the dehydrogenation of the corresponding ethyl-substituted cyclic compound. For instance, styrene, the most widely known and used of the vinyl-substituted cyclic monomers, is usually obtained by the dehydrogenation of ethylbenzene. This ethylbenzene is, in turn, usually obtained by the fractionation of relatively complex mixtures of petroleum-derived compounds which generally include in addition to ethylbenzene, o-, m-, and p-xylenes. To separate ethylbenzene from the xylenes, particularly m- and p-xylene, by fractionation is a rather difficult and expensive operation and, unless the quantity of ethylbenzene in the mixture is rather significant, is usually not economically attractive.

In addition to recovering ethyl-substituted cyclic compounds by fractionation, synthetic methods for producing such compounds have received considerable attention. Among the more prominent means by which the ethyl-substituted cyclic compounds are synthetically produced, is the alkylation of a cyclic nucleus with a paraffin or an olefin followed, generally, by dealkylation to remove excess methyl groups. Of course, by alkylation with ethane or ethylene, an ethyl-substituted cyclic compound may be obtained. However, ethylene so readily polymerizes under conditions ordinarily necessary to alkylation that it is not practical for use as an alkylating material. To alkylate with ethane usually would require obtaining a relatively pure ethane fraction, followed by halogenation of the ethane to obtain an ethyl halide which may then be alkylated onto the cyclic nucleus. Also, in most instances such alkylation and the subsequent dealkylation require catalysts which increase the cost of synthetically producing ethyl-substituted cyclic compounds.

It is an object of the present invention to provide a process for producing ethyl-substituted cyclic compounds. Another object of the present invention is to provide a process for producing ethyl-substituted cyclic compounds from paraffinic hydrocarbons and cyclic compounds having at least one methyl substituent. It is also an object of the present invention to provide a new and novel thermal, non-catalytic process for producing ethyl-substituted cyclic compounds. Still another object of the present invention is to provide a new and novel process for producing ethylbenzene. Additional objects will become apparent from the following description of the invention herein disclosed.

In fulfillment of these and other objects, it has been found that ethyl-substituted cyclic compounds may be obtained in good yields by means of a process which comprises introducing paraffin hydrocarbons and an unsaturated cyclic compound having at least one methyl-substituent into a reaction zone concurrently with a modifying agent selected from the group consisting of compounds and elements which at the conditions of the reaction zone will produce a compound selected from the group consisting of HCl, HBr, HI, $H_2S$ and combinations thereof, the reaction zone being maintained at a temperature of at least 450° C. and a pressure of at least 100 p.s.i.g.

To further describe and to illustrate the present invention, the following examples are presented. These examples are in no manner to be construed as limiting the present invention.

EXAMPLE I

Five separate runs were carried out with a feed consisting of toluene and a n-paraffin. The runs were carried out by placing a quantity of each of the reactants in a 4.1 ml. capacity bomb. In four of the runs, an amount of one of the modifying agents of the present invention sufficient to produce a concentration of 1 mole percent of the total mixture was added to the bomb. After the reactants or reactants and modifying agent were placed in the bomb, it was sealed and heated to a temperature of 500° C. and maintained at that temperature for about 20 minutes. The pressure was autogenous. The table below gives the amount of toluene, the identity and amount of the n-paraffin, the particular modifying agent used, if any, and the percent conversion to ethylbenzene.

| Run | Toluene | | n-Paraffin | | | Modifying Agent | Percent Conversion to Ethylbenzene |
|---|---|---|---|---|---|---|---|
| | Gram | Mole | Type | Gram | Mole | | |
| 1 | 0.784 | .00853 | $C_5$ | 0.266 | 0.00369 | 2-bromopropane | 17.8 |
| 2 | 0.780 | .00848 | $C_6$ | 0.260 | 0.00361 | do | 12.8 |
| 3 | 0.781 | .00849 | $C_5$ | 0.224 | 0.00311 | do | 14.8 |
| 4 | 0.765 | .00832 | $C_5$ | 0.220 | 0.00306 | Benzenethiol | 9.7 |
| 5 | 0.757 | .00823 | $C_5$ | 0.218 | 0.00303 | None | 1.5 |

Comparison of the results obtained in the above described runs dramatically illustrate the substantially increased conversions resulting from the present invention. Run 4, the poorest of the runs made in the presence of a modifying agent in accordance with the present invention resulted in an approximate 546% increase in conversion over Run 5 which was made under substantially the same conditions, but not in the presence of one of the modifying agents of the present invention. Run 1, the best of the above runs, made in the presence of a modifying agent resulted in an approximate 1088% increase in conversion over Run 5.

EXAMPLE II

A run was carried out under the same conditions of temperature, time and pressure and with the reaction bomb of Example I. In this run the feed consisted of 0.64 gram (0.00603 mole) of p-xylene and 0.195 gram (0.00271 mole) n-pentane. 2-bromopropane was used as the modifying agent in a concentration of one mole percent of the feed-modifying agent mixture. A conversion to p-ethyltoluene of 12.8 percent was obtained.

EXAMPLE III

A run is carried out by placing approximately equal moles of methylpyridine and n-butane in a reaction bomb of approximately one liter capacity. Bromobenzene is added to the reaction bomb in an amount such that its concentration in the bomb is approximately 3 mole percent of the mixture. The bomb is then heated to a temperature of 525° C. and brought to a pressure of 5000 p.s.i.g. under which conditions it is maintained for about 15 minutes. A good conversion of methylpyridine to ethylpyridine is obtained.

EXAMPLE IV

The run of Example III is substantially repeated with the exception that the feed consists of an approximately equal molar concentration of 1-methylnaphthalene and n-pentane. 3-chlorohexane is used as the modifying agent in this run in a concentration of approximately 0.5 mole percent of the total mixture. A good conversion of the 1-methylnaphthalene to ethylnaphthalene is obtained.

EXAMPLE V

The run of Example III is again substantially repeated with the exception that the feed consists of 1-methylcyclopentene and n-propane in a molar ratio of 1 to 2, n-propane to methylcyclopentene and the modifying agent is hexyl mercaptan present in a concentration of 2.5 mole percent of the total mixture. A good conversion of the methylcyclopentene to ethylcyclopentene is obtained.

EXAMPLE VI

Run 1 of Example I is substantially repeated with the exception that the paraffin hydrocarbon is n-nonane. A good conversion to ethylbenzene is obtained.

EXAMPLE VII

Run 1 of Example I is substantially repeated with the exception that 2-methylpentane is the paraffin hydrocarbon. A good conversion to ethylbenzene is obtained.

The unsaturated cyclic compounds useful as reactants in the process of the present invention must contain at least one methyl-substituent on the cyclic nucleus. These methyl-substituted unsaturated cyclic compounds are 1-methyl-substituted unsaturated cyclics in which the methyl-substituent is attached to a carbon atom of the cyclic nucleus which carbon atom is adjacent to double bond unsaturation of the cyclic nucleus. Such methyl-substituted cyclic compounds include methyl-substituted aromatic hydrocarbons, both mono-nuclear and poly-nuclear, heterocyclic compounds, and cyclo-olefinic and di-olefinic hydrocarbons. In addition to the required methyl-substituent on the cyclic nucleus, the cyclic compound may contain other methyl-substituents or other alkyl-substituents such as ethyl, propyl, and the like. Among the methyl-substituted aromatic hydrocarbons are such compounds as ethyltoluene, toluene, o-, m- and p-xylene, 1,3-diethyl-5-methylbenzene, 1-methylnaphthalene, 2-methylnaphthalene, di-methylnaphthalenes, 1,3,5-tri-methylbenzene, 1-methylphenanthrene, and the like. The methyl-substituted aromatic hydrocarbons also include the partially and totally condensed poly-nuclear aromatics among which are such compounds as methyl octa-hydronaphthalene, methyl-substituted tetralins, methyl-substituted dihydronaphthalenes, and the like. The methyl-substituted heterocyclic compounds include such compounds as methylpyridine, dimethylpyridines, trimethylpyridines, methyl-ethylpyridines, methyldihydropyran, methylpyran, dimethyldihydropyrans, dimethylpyrans, methylethylpyrans, methylfuran, dimethylfurans, methylsulfolene, dimethylsulfolenes, methylethylsulfolenes, methylsulfolene, dimethyl sulfolenes, methylbenzofuran, methylthionaphthalene, methylindole and the like. Included within the methyl-substituted cycloolefin and di-olefins hydrocarbons are such compounds as 1-methyl cyclopentene, 1-methyl cyclohexene, 1-methyl cycloheptene, 1-methyl cyclooctene, 1,2-dimethyl cyclopentenes, 1,3-dimethylcyclohexenes, dimethyl cycloheptenes, 1-methyl-ethyl cyclopentenes, methyl ethyl cyclohexenes, 1-methyl cyclopentadiene, 1-methyl cycloheptadienes and the like. The 1-methyl-substituted unsaturated cyclic compounds most often used as feeds in the practice of the present invention are those which have no substituents other than methyl-substituents and which have no more than three methyl-substituents. Preferred among the 1-methyl-substituted cyclic unsaturated compounds are the methyl-substituted aromatic hydrocarbons, particularly toluene, the xylenes, methyl naphthalenes and dimethyl naphthalenes. Since the most useful of the resulting products at present is ethylbenzene, then the most useful of the methyl-substituted cyclic compounds is toluene.

The methyl-substituted cyclic compounds may have in addition to the methyl substituent such non-hydrocarbon substituents as alkoxy groups, nitro groups and the like.

The paraffin hydrocarbons useful in the practice of the present invention may be either branched-chain or straight-chain. Most often, the paraffin hydrocarbon contains no less than 2 or more than 20 carbon atoms per molecule. If branched-chain, the paraffin hydrocarbon may have one or several branches with the same or varying numbers of carbon atoms in the branches. Usually, however, the branched-chain has no less than two branches with each branching being either a methyl or ethyl group. Several non-limiting examples of paraffin hydrocarbons useful in the process of the present invention are ethane, n-propane, n-pentane, n-hexane, n-heptane, n-octane, n-nonane, n-decane, n-undecane, n-dodecane, n-tridecane, n-tetradecane, n-heptadecane, n-octadecane, n-eicosane, 2-methylpentane, methylbutane, 2,3-dimethylbutane, 2,4-methylpentane, 2-methyl-4-ethylhexane, 3-methylhexane, 3-ethylhexane, 2,2-dimethylhexane, 3,5-methylheptane, 2-methyl-5-ethylheptane, 3,3-diethylhexane, 3-methyloctane, 3-methylnonane, 4,5-dimethyloctane, and the like. Particularly useful paraffin hydrocarbons are the n-paraffins of 3 to 10 carbon atoms per molecule with those of 4 to 8 carbon atoms preferred.

The amount of the reactants of the process of the present invention may vary over wide ranges. However, most often the mole ratio of paraffin hydrocarbon to methyl-substituted unsaturated cyclic compound is within the range of 1:100 to 100:1. In the particularly useful manner of practicing the present invention, the mole ratio of paraffin hydrocarbons to methyl-substituted unsaturated cyclic compounds is within the range of 1:5 to 5:1.

The modifying agents useful in the present invention comprise materials which under the conditions of the thermal reaction zone will decompose or otherwise form hydrogen chloride, hydrogen bromide, hydrogen iodide, hydrogen sulfide or combinations thereof. The term "agent" is meant to include, in the sense used herein, elemental sulfur, chlorine, bromine, and iodine as well as well as chemical compounds of which these elements are a part. The compounds which contain chlorine, bromine, iodine or sulfur may be either organic or inorganic compounds and may contain in addition to these elements such other elements as carbon, hydrogen, oxygen, or nitrogen. If the compound is an organic compound, it may be saturated or unsaturated, aliphatic or aromatic, straight-chain, branched-chain or cyclic in structure. Among the halogen-containing compounds within the scope of the present invention are the following non-limiting examples:

| Column I | Column II | Column III |
| --- | --- | --- |
| 2-bromopropane | Bromobenzene | Chloroethanoic acid. |
| 2-chloropropane | Chlorobenzene | Dibromoethanoic acid. |
| 1-iodopropane | m-Dichlorobenzene | Di-iodoethanoic acid. |
| 1-bromobutane | o-Dichlorobenzene | a-Chloroacetamide. |
| 1-chlorobutane | p-Dichlorobenzene | a-bromoacetanilide. |
| 2-iodobutane | m-Dibromobenzene | Benzoyl chloride. |
| 1-bromopentane | o-Dibromobenzene | Benzoyl bromide. |
| 2-bromopentane | p-Dibromobenzene | Benzoyl iodide. |
| 3-chloropentane | Iodobenzene | Butanoyl chloride. |
| 2-iodopentane | p-tolotoluene | Butanoyl bromide. |
| 3-bromohexane | m-iodotoluene | Butanoyl iodide. |
| 2-bromohexane | p-iodotoluene | 2-chloro-1, 4-benzenediol. |
| 2-iodohexane | o-Chlorotoluene | 2-bromo-1,4-benzenediol. |
| 2-bromo-4-methylhexane. | m-Chlorotoluene | 1-chloro-4-nitronaphthalene. |
| 3-chloroheptane | p-chlorotoluene | Ethylene chlorobromide. |
| 3-bromoheptane | o-Bromotoluene | Diphenoyl chloride. |
| 2-iodoheptane | m-Bromotoluene | Succinyl chloride |
| 2-bromo-4-ethylhexane. | p-Bromotoluene | 4-chloroquinoline. |
| 4-bromooctane | 3, 5-dibromotoluene | Ethanoyl iodide. |
| 3-chlorooctane | o-Bromo-chlorobenzene. | Hexanoyl chloride. |
| 2-iodooctane | m-Bromo-chlorobenzene. | Decanoyl chloride. |
| 1-bromononane | p-Bromo-chlorobenzene. | 2-bromoethanol. |
| 2-chlorodecane | 2-bromonaphthalene | 2-chloroethanol. |
| 2-bromodecane | 1-chloronaphthalene | bis-b-chloroethylether. |
| 2-bromo-6-methyldecane. | 1, 3-dichloronaphthalene. | Chloromethoxy methane. |
| 4-iodoundecane | 2-chlorodiphenyl | Cyclohexylbromide. |
| 1-bromododecane | 4-chlorodiphenyl | Carbon tetrachloride. |
| Hydrogen chloride | Chlorine gas | 2-chloro-3-hexene. |
| Hydrogen bromide | Bromine gas | 2-bromo-2-pentene. |
| Hydrogen iodide | Iodine | 3-bromo-4-octene. |

The halogen-containing compounds most useful in the practice of the present invention are those which contain a halogen from the group consisting of bromine, chlorine and iodine and the elements carbon and/or hydrogen. These compounds are the halogen-substituted hydrocarbons and hydrogen halides. There is no critical limit to the molecular weight of the modifying compound other than one of practicality in handling. It will generally be somewhat preferred, from a purely practical standpoint, to use those compounds which are normally liquid, but those that are normally gaseous are even more preferred. In the practice of the present invention, the preferred halogen compounds are the mono- and di-halogen substituted hydrocarbons of no more than 6 carbon atoms and the hydrogen halides. Though all of the halogens from the group consisting of bromine, chlorine and iodine are operable in the present invention, it is generally preferred to use those compounds containing chlorine and bromine with bromine being preferred over chlorine.

Among the sulfur-bearing compounds useful in the present invention are the following non-limiting examples:

allyl sulfide
benzyl disulfide
2-methyl-1-butanethiol
2-methyl-2-butanethiol
butyl disulfide
1,2-ethanedithiol
ethylene sulfide
ethyl sulfide
1-heptanethiol
isoamyl disulfide
isobutyl sulfide
methyl sulfide
1-naphthalenethiol
phenyl disulfide
2-methyl-1-propanethiol
2,2'-thiodiethanol
acetyl disulfide
o-bromo-benzenesulfonic acid
p-chloro-benzenesulfonic acid
methyl-benzenesulfonic acid
benzyl sulfide
3-methyl-1-butanethiol
tert-octanethiol
butylsulfide
ethanethiol
ethyl disulfide
furfuryl mercaptan
1-hexanethiol
isoamyl sulfide
methyl disulfide
2-naphthalenethiol
1-pentanethiol
1-propanethiol
2-propanethiol
thiophene
benzenesulfonic acid
p-bromo-benzenesulfonic acid
o-formyl-benzenesulfonic acid
benzyl sulfoxide
butyl sulfate
2,2'-bithiophene
butyl sulfone
dithio-carbamic acid
thiono-carbamic acid
dithiol-carbonic acid
dodecyl sulfate
ethionic anhydride
ethyl sulfone
ethyl sulfuric acid
methyl sulfoxide
2-bromothiophene
2,5-dimethylthiophene
2,3-dimethylthiophene
1-decanol sulfate
methyl sulfite
bis-(b-dichloroethyl)sulfide
tetradecyl sulfate
thionaphthenequinone
3-methylthiophene
elemental sulfur
benzoyl disulfide
butyl sulfoxide
thiol-carbamic acid
trithio-carbonic acid
cetyl sulfate
1,2-ethanedisulfonic acid
ethyl sulfite
ethyl sulfoxide
methanethiol
b,b'-dichloroethyl sulfide
2-chlorothiophene
2,5-diiodothiophene
vinyl sulfide
methyl sulfate
dichlorophenylphosphene sulfide
ethyl methyl sulfide
thionaphthene
2-methylthiophene
a-toluenethiol
sulfur dissolved in dialkylalkanolamine As noted from the above list of compounds, the sulfur-bearing modifying agents may contain such elements other than sulfur as carbon, hydrogen, oxygen, nitrogen, chlorine, bromine, iodine, and the like. Among the preferred modifying compounds are sulfur and such sulfur-bearing compounds as mercaptans or thiols both aliphatic and aromatic, hydrogen sulfide, thio ethers and thiourea. Also within this list of preferred compounds are those derived from dissolving sulfur in tertiary amines at elevated temperatures. The preferred modifying compounds are sulfur and sulfur-bearing compounds containing the additional elements of carbon and/or hydrogen. When using these sulfur-bearing compounds containing carbon and hydrogen, it is generally preferred that they contain no greater than 20 carbon atoms, with those containing less than 10 carbon atoms being preferred.

It is, of course, not necessary that the modifying agent be limited to a compound which will form one of the above-mentioned hydrogen halides or a sulfur compound which will form hydrogen sulfide. It is within the scope of the present invention that a combination of the two types of compounds may be used. For example, the present invention contemplates the use in combination as a modifying agent such compounds as bromo propane and benzyl mercaptan. Also, one compound may contain both a halogen atom and a sulfur atom and may suffice as a combination modifying agent. Such an example is 2-bromothiophene.

The amount of modifying agent necessary in carrying out the process of the present invention is such as to cause a molar concentration in the reaction mixture of no less than 0.01 mole percent. Seldom will the mole percent of the modifying agent in the reaction mixture exceed 50 percent. A preferred amount of modifying agent is that amount which will produce a concentration of modifying agent in admixture with the paraffin hydrocarbon and methyl-substituted cyclic compound within the range of 0.5 to 5.0 mole percent.

Temperatures at which the present invention is most often operated are within the range of 450 to 850° C. A preferred range of temperatures for operating the process of the present invention is 500 to 550° C. Generally, the pressures of the process of the present invention are in excess of 100 p.s.i.g., preferably within the range of from about 2000 to about 5000 p.s.i.g.

The method whereby the modifying agent and the reactants are brought into contact with one another is critical only to the extent that there should be a thorough, intimate contact between these components. Reactants and modifying agent may be concurrently introduced into a reaction zone which may be a batch container or a reaction chamber designed for continuous flow. If the process of the present invention is carried out as a continuous process, the reactants and modifying agent may be introduced into contact with one another by concurrent, crosscurrent or countercurrent flow. Further, either the reactants or either of the reactants or the modifying agent may be passed though a stationary liquid column of the other or others to effect the necessary contact.

What is claimed is:
1. A thermal non-catalytic process for producing ethyl-substituted compounds which comprises introducing paraffin hydrocarbons and an unsaturated cyclic compound having at least one methyl-substituent into a reaction zone concurrently with a modifying agent selected from the group consisting of compounds and elements which at the conditions of the reaction zone will produce a compound selected from the group consisting of HCl, HBr, HI, $H_2S$ and combinations thereof, the reaction zone being maintained at a temperature of at least 450° C. and the pressure of at least 100 p.s.i.g.

2. The process of claim 1 wherein the paraffin hydrocarbons contain 2 to 20 carbon atoms per molecule.

3. The process of claim 2 wherein the paraffin hydrocarbons are n-paraffins.

4. The process of claim 3 wherein the n-paraffins have 3 to 10 carbon atoms per molecule.

5. The process of claim 1 wherein the methyl-substituted unsaturated compound is a methyl-substituted aromatic hydrocarbon.

6. The process of claim 1 wherein the methyl-substituted unsaturated cyclic compound is a methyl-substituted hetero-cyclic compound.

7. The process of claim 1 wherein the methyl-substituted unsaturated cyclic compound is a methyl-substituted cycloolefinic hydrocarbon.

8. The process of claim 1 wherein the methyl-substituted unsaturated cyclic compound is a methyl-substituted cyclo-diolefinic hydrocarbon.

9. The process of claim 1 wherein the paraffin hydrocarbons are present in the reaction zone in mole ratio to the methyl-substituted unsaturated cyclic compound of 1:100 to 100:1.

10. The process of claim 1 wherein the modifying agent is a halogen-substituted hydrocarbon of no greater than 6 carbon atoms and in which the halogen is one selected from the group consisting of iodine, bromine, chlorine and combinations thereof.

11. The process of claim 1 wherein the modifying agent is selected from the group consisting of HCl, HBr, HI and combinations thereof.

12. The process of claim 1 wherein the modifying agent is selected from the group consisting of iodine, bromine, chlorine and combinations thereof.

13. The process of claim 1 wherein the modifying agent is elemental sulfur.

14. The process of claim 1 wherein the modifying agent is a sulfur bearing compound selected from the group consisting of mercaptans, hydrogen sulfide, thioethers, sulfur dissolved in tertiary amines, and thioureas.

15. The process of claim 1 wherein the amount of modifying agent is such as to cause a molecular concentration in the reaction zone within the range of 0.10 to 50.0 mole percent.

16. The process of claim 1 wherein the temperature is within the range of 450 to 850° C.

17. The process of producing ethylbenzene which comprises introducing toluene and a n-paraffin hydrocarbon of 4 to 8 carbon atoms per molecule in a mole ratio of 1:100 to 100:1 into a reaction zone concurrently with a modifying agent selected from the group consisting of compounds and elements which at the conditions of the reaction zone will produce a compound selected from the group consisting of HCl, HBr, HI, $H_2S$ and combinations thereof, the reaction zone being maintained at a temperature of at least 450° C. and the pressure of at least 100 p.s.i.g.

18. The process of producing ethylnaphthalene which comprises introducing methylnaphthalene and a n-paraffin hydrocarbon of 4 to 8 carbon atoms per molecule in a mole ratio of 1:100 to 100:1 into a reaction zone concurrently with a modifying agent selected from the group consisting of compounds and elements which at the conditions of the reaction zone will produce a compound selected from the group consisting of HCl, HBr, HI, $H_2S$ and combinations thereof, the reaction zone being maintained at a temperature of at least 450° C. and the pressure of at least 100 p.s.i.g.

19. The process of producing ethyltoluene which comprises introducing xylene and a n-paraffin hydrocarbon of 4 to 8 carbon atoms per molecule in a mole ratio of 1:100 to 100:1 into a reaction zone concurrently with a modifying agent selected from the group consisting of compounds and elements which at the conditions of the reaction zone will produce a compound selected from the group consisting of HCl, HBr, HI, $H_2S$ and combinations thereof, the reaction zone being maintained at a temperature of at least 450° C. and the pressure of at least 100 p.s.i.g.

References Cited
UNITED STATES PATENTS

| 2,883,439 | 4/1959 | Wald | 260—668 |
| 3,198,845 | 8/1965 | Franz | 260—668 |

FOREIGN PATENTS 225,364  11/1959  Australia.

DELBERT E. GANTZ, *Primary Examiner.*

C. R. DAVIS, *Assistant Examiner.*